(12) United States Patent
Cicognani

(10) Patent No.: US 7,878,366 B2
(45) Date of Patent: Feb. 1, 2011

(54) UNIT FOR FILLING CONTAINERS WITH PRODUCTS, IN PARTICULAR, PHARMACEUTICAL PRODUCTS

(75) Inventor: Sergio Cicognani, Faenza (IT)

(73) Assignee: I.M.A. Industria Macchine Automatiche S.p.A., Ozzano Emilia (Bologna) (IT)

( * ) Notice: Subject to any disclaimer, the term of this patent is extended or adjusted under 35 U.S.C. 154(b) by 405 days.

(21) Appl. No.: 10/515,037

(22) PCT Filed: May 20, 2003

(86) PCT No.: PCT/IB03/01934
§ 371 (c)(1),
(2), (4) Date: Nov. 18, 2004

(87) PCT Pub. No.: WO03/097459
PCT Pub. Date: Nov. 27, 2003

(65) Prior Publication Data
US 2005/0217208 A1    Oct. 6, 2005

(30) Foreign Application Priority Data
May 21, 2002  (IT)  .............................. BO02A0313

(51) Int. Cl.
*G07F 11/00*  (2006.01)
*B65B 5/10*  (2006.01)
*B65B 5/00*  (2006.01)
*B65B 61/20*  (2006.01)
*B65H 29/68*  (2006.01)

(52) U.S. Cl. .................. 221/7; 53/54; 53/250; 53/244; 271/71; 198/771

(58) Field of Classification Search .............. 53/54, 53/250, 501, 504, 544, 900, 244, 160; 221/7; 198/771, 758; 271/71
See application file for complete search history.

(56) References Cited

U.S. PATENT DOCUMENTS
3,076,649 A * 2/1963 Stevenson .................. 271/307

(Continued)

FOREIGN PATENT DOCUMENTS
JP          56067567 A  *  6/1981

(Continued)

*Primary Examiner*—Gene Crawford
*Assistant Examiner*—Rakesh Kumar
(74) *Attorney, Agent, or Firm*—William J. Sapone; Coleman Sudol Sapone P.C.

(57) ABSTRACT

A unit (100) for filling containers (2) with products (1), in particular pharmaceutical products (1), includes a hopper (3,3a) containing a mass of products (1) in bulk, conveying means (5,6) aimed at feeding the products (1) leaving the hopper (3) along a predetermined path (P) up to a station (SR), where the containers (2) are filled with the products (1). The containers (2) are fed to the filling station (SR) by transporting means (4,C). A checking station (SC) for checking the products (1) is situated along the path (P) upstream of the filling station (SR). The conveying means (5,6) include first means (51,52,53) consisting of vibrating planes and second conveying means (6). The second conveying means (6) are situated at the checking station (SC) between the conveying vibrating planes means (51,52,53) and the filling station (SR). The second conveying means (6) are equipped with holding means (65) for holding single products (1) thus forming, on the second conveying means (6), a series of single products (1), spaced apart and moving forward to the filling station (SR) along a portion of the path (P).

5 Claims, 5 Drawing Sheets

U.S. PATENT DOCUMENTS

| | | | | |
|---|---|---|---|---|
| 3,206,062 | A | * | 9/1965 | Rappaport ..................... 221/7 |
| 3,490,197 | A | * | 1/1970 | Cremieux ..................... 53/55 |
| 3,513,956 | A | * | 5/1970 | Rayment ..................... 193/44 |
| 3,585,015 | A | * | 6/1971 | Hohlfeld et al. ............... 65/443 |
| 3,618,819 | A | * | 11/1971 | Blackburn et al. ............. 221/2 |
| 3,767,089 | A | * | 10/1973 | McKee et al. ............... 222/221 |
| 3,789,575 | A | * | 2/1974 | Bross .......................... 53/534 |
| 3,900,718 | A | * | 8/1975 | Seward ....................... 702/128 |
| 4,054,015 | A | * | 10/1977 | Rowell ........................ 53/446 |
| 4,368,382 | A | * | 1/1983 | Nishiguchi ..................... 377/6 |
| 4,674,259 | A | * | 6/1987 | Hills ........................... 53/202 |
| 4,677,283 | A | * | 6/1987 | Lewis ...................... 235/98 C |
| 5,317,645 | A | * | 5/1994 | Perozek et al. ............. 382/141 |
| 5,463,839 | A | * | 11/1995 | Stange et al. .................. 53/54 |
| 5,890,350 | A | * | 4/1999 | Tisma ......................... 53/543 |
| 6,053,302 | A | * | 4/2000 | Leu et al. .................. 198/471.1 |
| 6,108,030 | A | * | 8/2000 | Yamamoto et al. ............ 348/91 |
| 6,266,946 | B1 | * | 7/2001 | Aylward ....................... 53/501 |
| 6,568,151 | B2 | * | 5/2003 | Buckley et al. ............... 53/240 |
| 6,631,799 | B2 | * | 10/2003 | Samson ...................... 198/771 |
| 2001/0045081 | A1 | * | 11/2001 | Aylward ....................... 53/244 |
| 2002/0108356 | A1 | * | 8/2002 | Aylward ....................... 53/473 |

FOREIGN PATENT DOCUMENTS

| | | | | |
|---|---|---|---|---|
| JP | 59125486 | A | * | 7/1984 |
| JP | 11301601 | A | * | 11/1999 |
| JP | 2002230513 | A | * | 8/2002 |

* cited by examiner

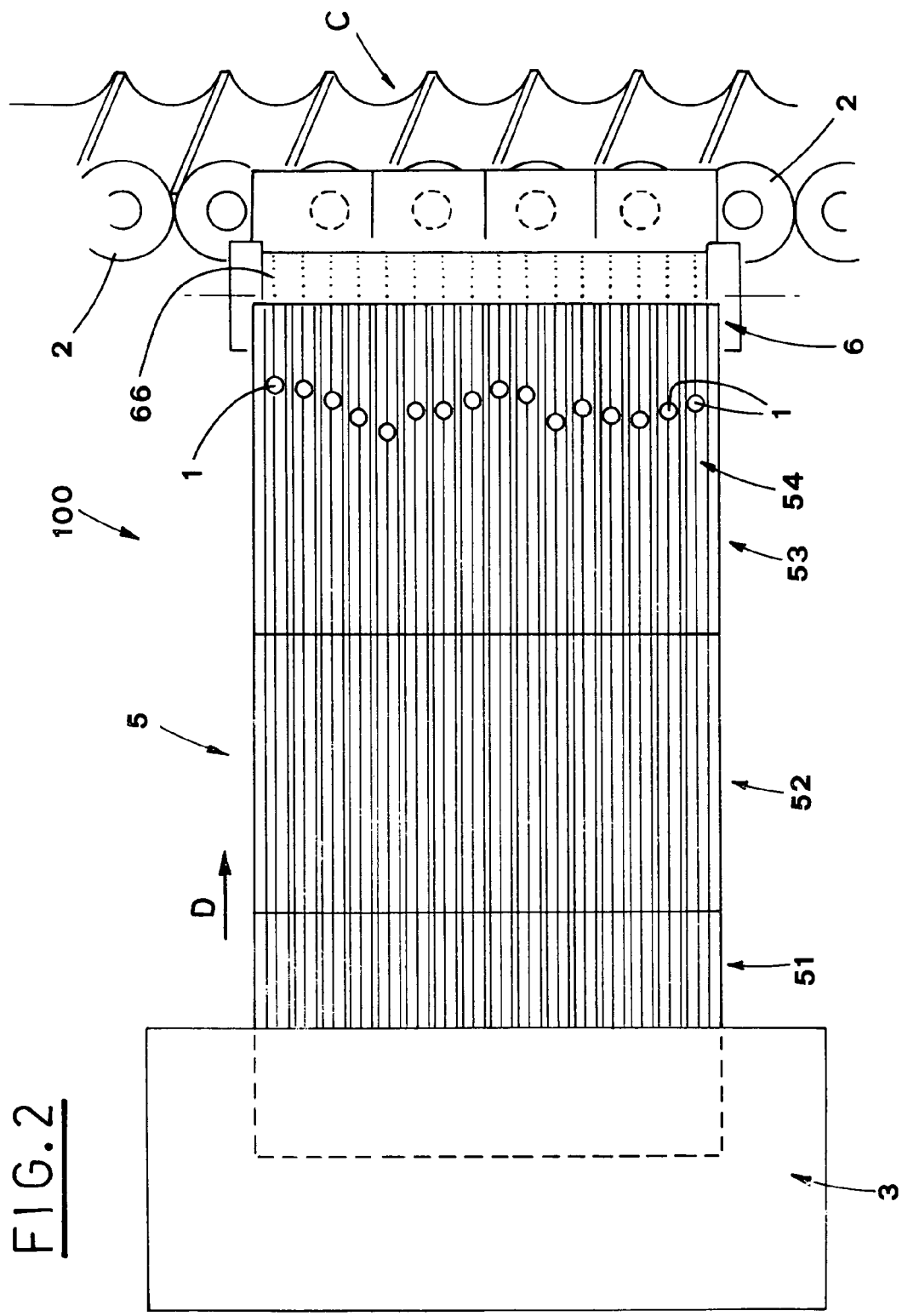

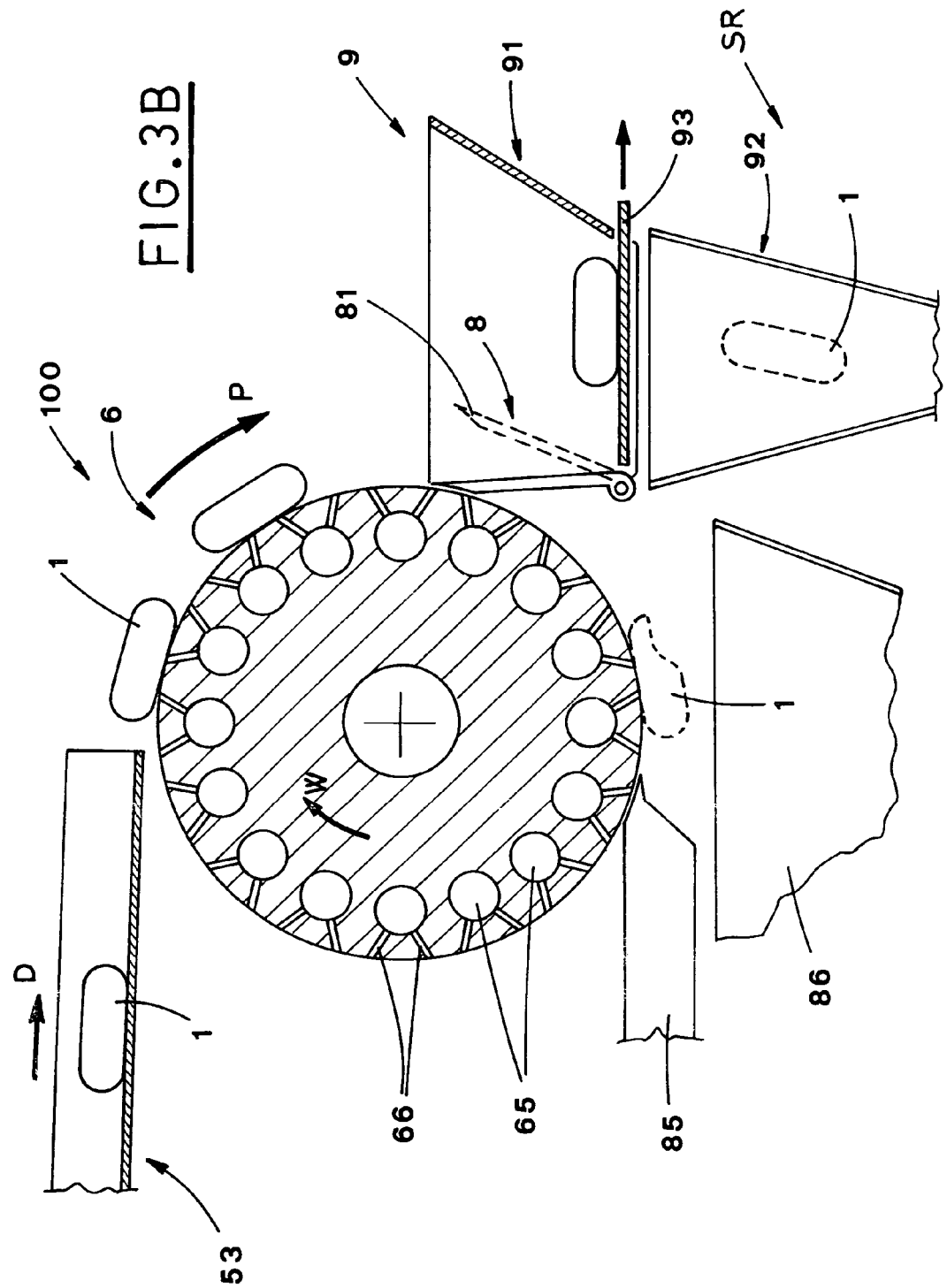

UNIT FOR FILLING CONTAINERS WITH PRODUCTS, IN PARTICULAR, PHARMACEUTICAL PRODUCTS

FIELD OF THE INVENTION

The present invention relates to automated packaging of small products into containers.

In particular, the invention relates to a unit for continuously feeding and counting such products, mainly pharmaceutical products, such as tablets, pills or capsules for pharmaceutical use, from now on called simply pharmaceutical tablets without losing the universality, and for subsequently introducing the pharmaceutical tablets into bottles or the like.

BACKGROUND OF THE INVENTION

In the pharmaceutical production field, there are commonly known and used packaging machines for automatic packaging of pharmaceutical tablets supplied in bulk into bottles.

Usually, a packaging machine of known type includes several working groups, among which, in particular, there are a device for orderly feeding and counting tablets, preferably performing a tablet quality check, and a device for filling the bottles, moving stepwise on a conveyor, with a predetermined number of tablets.

There are several types of packaging machines for automatic packaging pharmaceutical tablets into bottles, types which differ mainly by the techniques used for orderly feeding and counting the tablets.

A packaging machine belonging to a first type includes a feeding and counting device formed by a series of small bars arranged one beside another, crosswise with respect to the conveying direction and featuring a plurality of seats, each of which receives a single tablet.

The above small bars are carried along the conveying direction below a hopper, which contains a mass of tablets in bulk, so that each seat can receive a single tablet.

The small bars are then moved toward a discharge station, where the tablets are released into the bottles, by the effect of gravity, making fall one or more tablets from one of the small bars into each bottle suitably arranged on the conveyor below the hopper.

Thus, the number of seats of each small bar defines the maximum number of bottles, which can be filled simultaneously.

The machines of the above described type reach considerable operation speed (even 300-400 bottles filled in a minute), however they present many limits and drawbacks.

First of all, the seats of the small bars are not always correctly filled during the passage below the hopper, because the tablets of irregular shape can be arranged in an incorrect position with respect to the relative seat, or some seats can be occupied by tablet fragments or by a non entire tablet.

Therefore, it can quite easily happen that a bottle is filled in an incomplete, or incorrect way.

Moreover, if a defective or partially damaged tablet is detected, the above described machines are not able to reject a single defective table and therefore it is necessary to reject the whole bottle containing the defective tablet, which obviously results in considerable economic consequences.

Further drawbacks result from the complexity of the size change over operations in order to adapt the machine to operate with tablets and/or bottles of different sizes, since in order to work with each different type or size of tablets or capsules, it is necessary to substitute the whole group of the small bars.

Another known type includes packaging machines featuring a plurality of rotating discs arranged one beside another along their axis.

Each disc is driven into rotation independently from the others and features, along its circumference, a number of seats for receiving therein the tablets to be packaged.

A hopper containing a mass of tablets in bulk is situated directly above the plurality of discs.

During rotation, each disc withdraws single tablets, one by one, from the hopper.

The disc rotation brings each tablet to an instability point, and consequently makes it fall into a bottle situated below.

During this step, each tablet can be counted and its entireness can be checked by suitable check devices.

Although the above described packaging machines with discs are very fast and reliable at the tablets counting, they require the substitution of the whole group of discs each time the size and/or the shape of the tablets to be packaged is changed.

This makes the use of this type of machines particularly expensive if there are several sizes of the tablet to be packaged.

A known packaging machine of a further type includes a plurality of vibrating planes arranged in succession along the conveying path of the tablets to be packaged.

The tablets are continuously fed to the vibrating planes from a hopper, and then they are gradually spaced apart and conveyed toward a counting area, at the outlet of the vibrating planes.

The vibrating planes are usually equipped with longitudinal guides, arranged one beside another and containing each one a row of tablets.

Each tablet is counted at the outlet of the relative guide by photo-cell or capacitive sensors, generally during its fall into a channel conveying it toward the bottle to be filled.

The number of longitudinal guides situated one beside another defines the number of bottles which can be filled simultaneously.

The structure of this type of machine is usually simple and easy to maintain.

Also the size change over operations are rather simple.

On the other hand, their production rate is rather limited and not always the spacing of the tablets in the area of the outlet of the vibrating planes is optimal.

This results in considerable problems in tablets counting and checking of their entireness.

In a packaging machine of another known type, such e.g. the one described in the U.S. Pat. No. 5,463,839, the tablets to be packaged are carried by a hopper on an inclined plane equipped with a series of channels, arranged side by side, each of which receives single tablets, one by one.

The inclined plane moves the tablets toward a counting and packaging area.

The above channels have undulated extension, and the undulation amplitude is gradually decreasing.

Therefore, the tablets move faster and faster, coming close to the counting area and thus they are spaced apart, or singled out, so as to be counted during the descent into the bottles.

Also the structure of the last packaging machine is very simple, but it presents considerable drawbacks, first of all in the spacing apart of elongated or oblong tablets, since the oblong tablets can easily stick or take a crosswise position in the undulated channels, thus causing the channels obstruction, which results in an incorrect feeding and consequently filling of bottles.

SUMMARY OF THE INVENTION

The object of the present invention is to propose a unit for feeding pharmaceutical tablets to bottles, which avoids the above mentioned drawbacks of the prior art.

In particular, an object of the present invention is to propose a unit, which ensures a rapid and safe feeding of the tablets to be packaged to the counting area, keeping a simple structure, which is easily accessible for maintenance operations.

Another object of the present invention is to propose a unit, which can efficiently move away and single out the tablets, in order to allow particularly reliable operations of tablets counting and entireness checking.

A further object of the present invention is to propose a unit, which rejects single defective tablets.

A still further object of the present invention is to propose a packaging machine, which is equipped with the above unit, and which operates easily with products of different sizes, thus requiring a reduced number of elements to be replaced during the size change over.

According to the present invention, a unit for filling containers with products, in particular pharmaceutical products, includes a hopper containing a mass of products in bulk, conveying means aimed at feeding the products, coming out of the hopper, along a predetermined path up to a station where the containers are filled with the products, said containers being fed to said filling station by transporting means; and a product checking station, situated along said path upstream of said filling station; the unit being characterized in that said conveying means include:

first conveying means consisting of vibrating planes;

second conveying means situated at said checking station between said conveying vibrating planes means and said filling station; and product holding means associated to said second conveying means for keeping single products, so as to form, on said second conveying means a succession of single spaced apart products, moving forward to said filling station along a part of said path.

The second conveying means preferably include a rotating drum, aimed at moving the successions of single products to the filling station, along a curved part of the path.

BRIEF DESCRIPTION OF THE DRAWINGS

The characteristic features of the invention, as will appear from the subsequent claims, are pointed out in the following description of a preferred, but not limiting embodiment of the invention with reference to the enclosed drawings, in which:

FIG. 2 is a schematic top view of the unit of FIG. 1;

FIG. 3b is the same lateral section view as FIG. 3a view, with a functional variant;

FIG. 5 is a section view taken along the section V-V of FIG. 3a.

BEST MODES OF CARRYING OUT THE INVENTION

Figure 1:
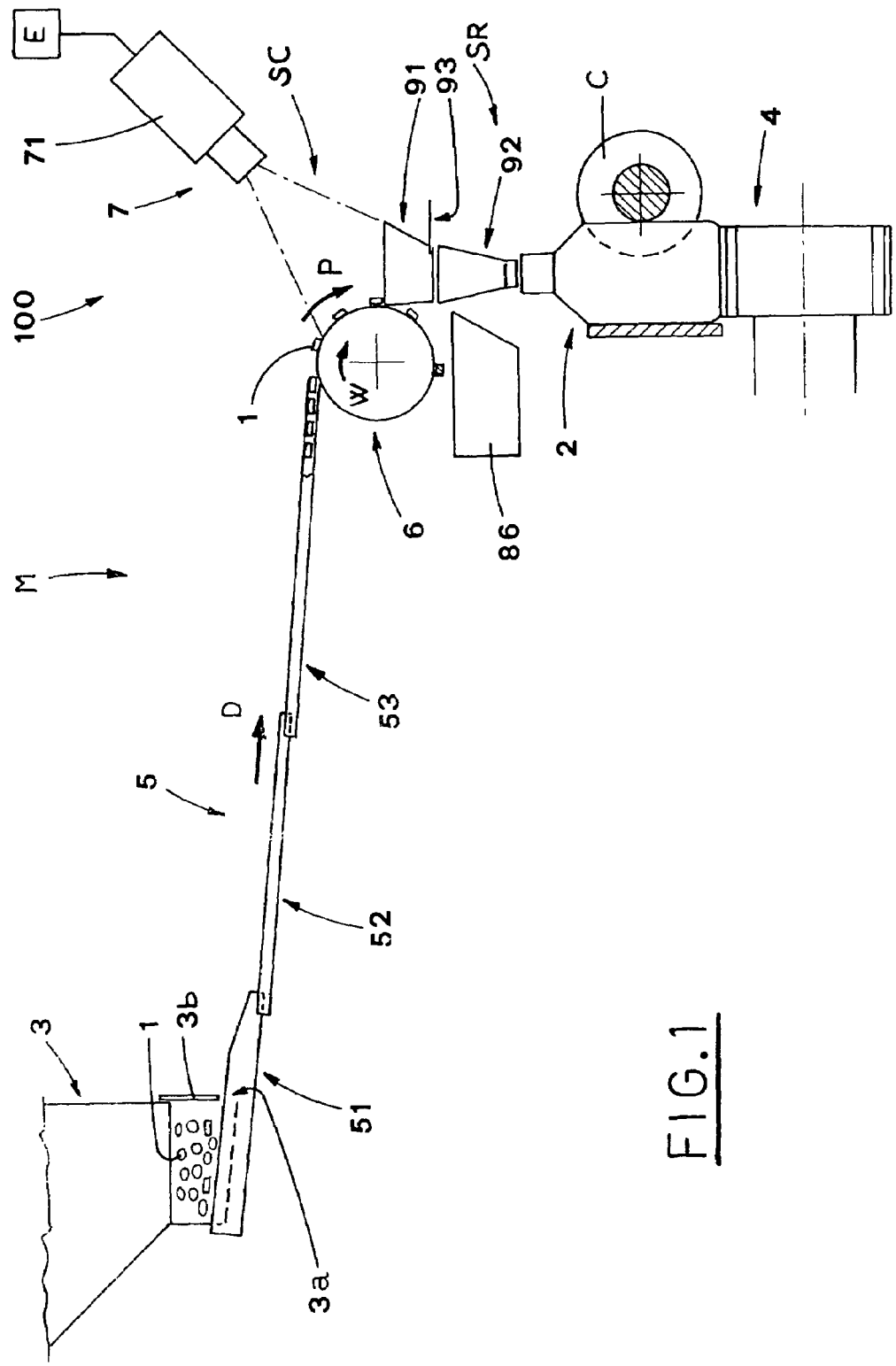
FIG. 1 is a schematic lateral view, partially in section and with some parts removed for sake of clarity, of a preferred embodiment of the unit proposed by the present invention.

With reference to FIGS. 1 and 2, the reference indication M stands for a machine packaging pharmaceutical tablets 1 into corresponding bottles 2.

The tablets 1 are moved forward to a filling station R on a carrier 4 by a feed screw C operated discontinuously.

The reference numeral 100 indicates a unit for feeding and counting the tablets 1, which unit is an integral part of the packaging machine M.

According to what has been shown in FIG. 1, the unit 100 includes a feeding hopper 3, containing a mass of tablets 1 in bulk and equipped with a lower mouth 3a, through which the tablets 1 exit due to gravity force. The lower mouth 3a is provided with a relative closing shutter 3b.

In particular, according to a preferred embodiment, the hopper 3 is equipped with three outlet mouths 3a with relative shutters 3b, which move in such a way as to allow, when in use, to automatically adjust the outlet flow of the tablets 1, in order to regularly space them apart.

According to what has been shown in FIGS. 1 and 2, the unit 100 includes a conveyor 5, which receives continuously the tablets 1 falling from the hopper 3 and arranges them substantially in parallel rows, so as to carry them to the filling station SR in a direction D defined crosswise with respect to the forward movement direction of the bottles 2 on the carrier conveyor 4.

The conveyor 5 is supported by a structure, which has not been shown in FIG. 1 and which is a part of the machine M.

The structure includes preferably, but not only, three vibrating conveying planes 51, 52 and 53, driven to vibrate by vibrating means, known and not shown.

The vibrating planes are arranged one after another and are slightly inclined downwards in the direction D.

More precisely, the vibrating plane 51 situated upstream is arranged with its initial portion directly below the outlet mouth 3a of the hopper 3, the intermediate vibrating plane 52 is situated downstream of the plane 51, and the vibrating plane 53 is situated downstream of the intermediate plane 52.

As it is seen in FIG. 1, the initial portion of the vibrating planes situated more downstream in the direction D lies below the terminal portion of the plane situated directly upstream, still in direction D.

As seen in FIG. 2, each vibrating plane 51, 52, 53 is equipped with a plurality of longitudinal guides 54, situated one beside another and parallel to one another.

Figure 4:
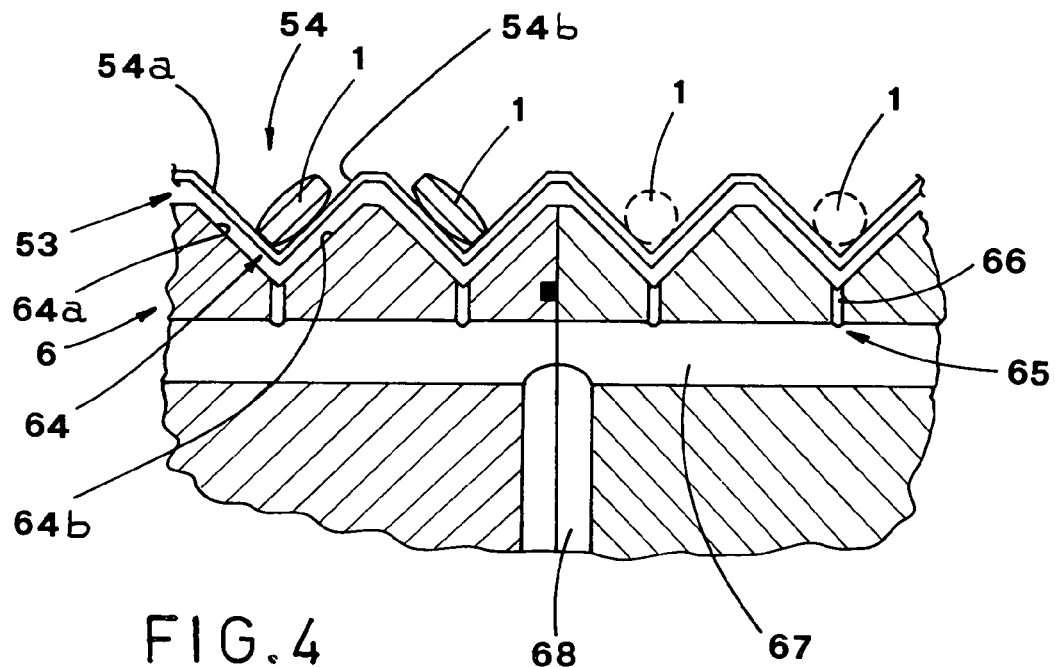
FIG. 4 is a cross-section view of an alternative embodiment of a particular of the unit of FIG. 1.
Figure 5:
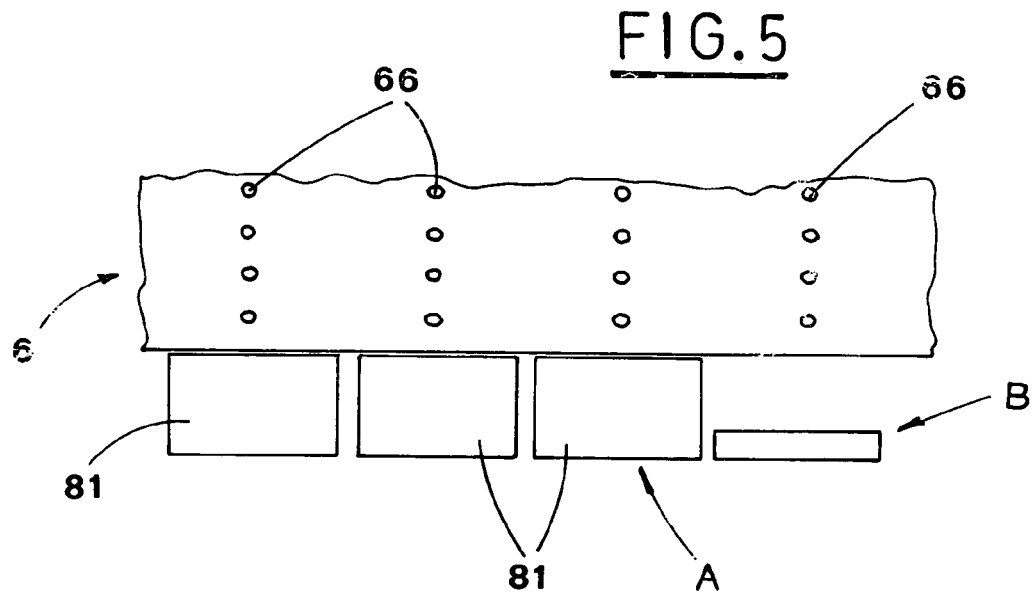

Each guide 54 is aimed at receiving and conveying, one by one, the tablets 1 in a single row, and presents lateral walls 54a, 54b converging toward the bottom of the guides 54 (see FIG. 4).

Essentially, as it is possible to see in FIG. 4, each guide 54 has preferably a substantially up-turned triangle cross-section, with the base open and the vertex turned downwards.

According to a not shown variant, the guides 54 have substantially U-section.

This, together with the continuous vibration effect, allows to obtain a well determined arrangement of the tablets 1.

In particular, in case of substantially discoid tablets (FIG. 3a), they tend to lean against a lateral wall 54a, 54b, while in case of elongated or oblong tablets 1 (FIG. 3b), they tend to assume a position with their main axis oriented longitudinally with respect to the relevant guide 54.

The guides 54 of the subsequent vibrating planes 51, 52, 53 are aligned with respect to each other, so that each of them can receive tablets 1 leaving the plane situated more upstream.

The unit 100 includes also another conveyor 6, consisting of a rotating drum, which is situated directly downstream, in the direction D, of the conveyor 5 and extends along the whole crosswise extension of the conveyor 5.

The rotating drum conveyor 6 is aimed at rotating continuously clockwise in direction W, with respect to FIG. 1, with a determined angular speed, so as to feed the tablets 1 along a feeding path P up to the station SR, where the bottles 2 are filled. The curved section of the feeding path P is substantially defined by the edge of the drum 6.

Figure 3A:
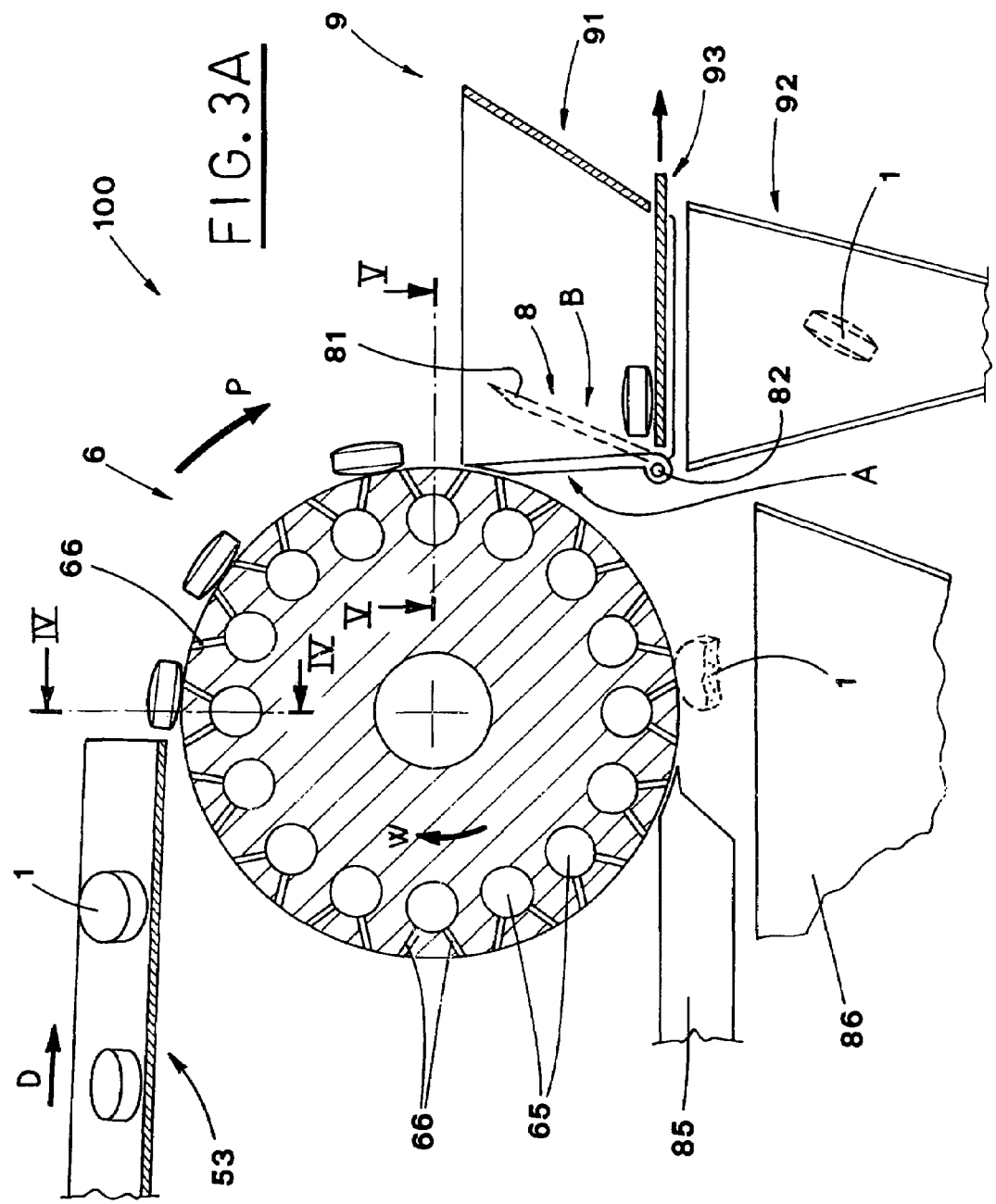
FIG. 3a is a lateral section view of some working stations of the unit of FIG. 1.

According to what is shown in FIGS. 2, 3a and 3b, the drum 6 is arranged with the upper part of its peripheral surface situated directly below the outlet portion of the fore vibrating plane 53.

The cylindrical peripheral surface of the drum 6, according to the preferred embodiment shown in FIGS. 1, 3a and 3b, is substantially smooth.

Otherwise, like in the alternative embodiment shown in FIG. 4, the whole peripheral surface of the drum 6 features a plurality of grooves 64, each of which has lateral walls 64a, 64b converging toward the bottom of the groove 64 and with a substantially up-turned triangle conformation, like the walls 53a, 53b of each guide 54 of the plane 53, in order to receive the tablets 1 released by the corresponding guide 54.

The drum 6 includes also holding means 65, which act to hold the tablets 1 on the surface of the drum 6, in particular within the grooves 64, according to the embodiment shown in FIG. 4.

The holding means 65 include a plurality of channels 66, 67, 68, situated inside the drum 6.

The channels 66, 67, 68 (FIGS. 3a, 3b) are aimed at setting the surface of the drum 6 in communication with a vacuum source, known and not shown, which creates an aspiration effect at the drum surface, so as to hold the tablets 1 by aspiration.

In particular, the peripheral surface of the drum 6 features a plurality of channels 66 (plurality of pairs of channels 66 in FIGS. 3a, 3b), opening close to each other, so that even a small tablet 1 is anyway situated within the action range of the depression created by at least one of the channels 66, and is therefore held by the aspiration of the drum 6.

According to what has been shown better in FIG. 1, the curve section of the path P, covered by the tablets conveyed by the drum 6, extends passing through a checking station SC, where the unit 100 includes checking means 7 aimed at acquiring information concerning the tablets 1 during their movement toward the station SR.

This information relates in particular to the detection of the passage of each tablet 1 in a predetermined point, possibly also to the detection of some characteristics, such as shape, color or others, necessary to evaluate the integrity of the examined tablet and to perform a precise counting of the tablets 1 passing through the station SC along the path P.

In order to perform the above detection in an efficient and optimal way, the checking means 7 include preferably a videocamera or telecamera 71, whose optical path is oriented toward the drum 6, so that it can see the whole extension of the drum 6.

The videocamera 71 is also connected, in a wholly known way, to a processing device E, in order to send the latter the signals related to detections effected. Thus, the signals can be suitably processed.

According to what has been shown in FIGS. 3a and 3b, the unit 100 includes also deflector means 8, which are situated near the drum 6, downstream of the check station SC and upstream of the filling station SR, and which detach the tablets 1 from the drum 6, so that the tablets fall into corresponding packaging channels 9.

The deflector means 8 include a plurality of deflecting bars 81, situated one beside another.

Each bar 81 is pivoted onto a pin 82 and is aimed at being moved by operating means, not shown, which are connected to the processing device E, alternately between a detach position A, in which the free end of the bar 81 intercepts and detaches the tablets 1 conveyed by the drum 6, and tablets rejection position B (indicated with broken line in FIGS. 3a and 3b), in which the bar 81 is situated far from the drum 6 surface, so that the tablets 1, found defective by the videocamera 71 and held on the drum 6, are moved forward to a subsequent rejection station, where the defective tablets 1 are detached from the drum 6 by a motionless deflecting panel 85 and fall into a rejection container 86.

Each of the above mentioned packaging channels 9 includes an upper housing 91, whose outlet mouth communicates with an inlet mouth of a lower housing 92, which in turn, has an outlet mouth situated above a bottle 2 (FIG. 1).

According to what has been shown in FIGS. 3a, 3b, a bulkhead 93 is situated between the upper housing 91 and the lower housing 92.

The bulkhead 93 is moved alternately by activating means, not shown and operated by the processing device E, between a position, in which the outlet mouth of the upper housing 91 is closed, and a position, in which the same outlet mouth is open.

The operation of the unit 100 is described in the following, beginning from an operation condition in which a mass of tablets 1 is present in bulk within the hopper 3, and the bottles 2 to be filled have been brought on the transporting conveyor 4, by the feed screw C, to the filling station SR.

The vibrating planes 51, 52, 53, are operated, that is the vibrating means are activated, and the drum 6 is driven into rotation in the direction W.

Therefore, the vibration of the planes 51, 52, 53 creates a gradual forward movement of the tablets 1 along each guide 54 of the vibrating planes, toward and at the drum 6.

According to another, not shown, embodiment, each vibrating plane 51 is connected to two vibrating means, applied to the opposite lateral ends of the plane 51, in order to ensure that the best uniform distribution of the tablets 1 can reach, through other planes 52 and 53, the drum 6, thus preventing the drum 6 from being not perfectly and not uniformly loaded with the tablets 1.

When the tablets 1 are released by the guides 54, due to the conformation thereof, they are arranged in a well defined way; thus the tablets 1 fall and reach the peripheral surface of the drum 6 and are held by the suction present in the channels 66.

In particular, the angular speed of the drum 6 is suitably and automatically adjusted, so that two tablets 1 situated one after another, are spaced apart (that is singled out) in best way.

In the check station SC, each tablet 1 is perfectly detected by the telecamera 71, and then its integrity is verified.

Each tablet 1, if considered perfectly entire, is then intercepted by the deflecting bar 81, situated in the detachment position A, due to the command of the processor E, which has received a suitable signal from the videocamera 71.

Afterwards, the intercepted tablet 1 is conveyed toward the corresponding packaging channel 9.

In operation, if a bottle 2 being filled is present under the channel 9, the bulkhead 93 is kept open due to the command of the processor E, in function to the information of the telecamera 71, and the tablet proceeds toward the bottle 2, taking place thereinside.

Otherwise, if there is no bottle 2, because the feed screw C is bringing a subsequent group of empty bottles to the station SR and on the conveyor 4, the bulkhead 93 is close, still due to the command of the processor E, which has received a suitable signal from the telecamera 71, and the tablets 1 are accumulated in the upper housing 91 until a new bottle 2 is available.

When this occurs, the bulkhead 93 is open again to allow the tablets 1 present in the housing 91 to go down.

When the counting of the tablets 1 by the telecamera 71 reaches a predetermined and memorized value, that is when the bottle 2 is considered filled with tablets 1, the bulkhead 93 is closed again, still due to the command of the processor E, which has received an information signal from the telecamera 71, concerning the full bottle 2.

If the telecamera 71 considers a tablet 1 defective and/or not entire or anyway, faulty (indicated with broken line in FIGS. 3a and 3b), the corresponding deflecting bar 81 is brought to the rejection position B, due to the command of the processor E, and thus the defective tablet 1 is conveyed by the drum 6 until it is intercepted by the motionless deflecting panel 85 and conveyed into the container 86 of tablets 1 to be rejected.

One of the important advantages of the above described unit 100 for feeding and counting tablets 1 is that it ensures a rapid and secure transport, without jamming of single tablets 1 to be packaged, toward the checking station SC and the subsequent filling station SR, maintaining a simple structure of the packaging machine M.

Another advantage derives from an efficient spacing or separation of the adjacent tablets 1 in the check station SC due to the efficient presence of the sucked drum 6 below the vibrating plane 53, which allows particularly rapid and efficient counting and optical check of entireness of the tablets 1 by the telecamera 71, without possibility of error.

A further advantage of the unit 100 lies in the possibility to work with different sizes and dimensions of tablets 1, which consequently requires a reduced number of elements substitution and downtimes of the packaging machine M, of which the unit 100 is a part.

Actually, the conformation of the guides 54, as well as the presence of the system for maintaining the drum 6 surface in suction condition, allows to use the same elements for tablets 1 having even very different sizes and dimensions.

Moreover, the unit 100 proposed by the present invention, due to the system of deflecting bars 81 operated to move by the processor E consequently to the signal of the telecamera 71, allows rejection of single tablets 1 considered defective, without the necessity to reject the whole bottles 2 because of the presence of only one faulty tablet 1, as it occurs in the currently used packaging machines.

Moreover, the presence of the bulkhead 93 closing the channels 9 allows to continue the feeding, without interruptions, of the tablets 1 even if there are no bottles 2 in the filling station SR, that is in the moments subsequent to the exit of a group 2 of full bottles from the station SR and before a new group of bottles 2 to be filled arrives.

Therefore, the packaging machine M can work with very high working speed.

The invention claimed is:

1. A unit (100) for filling containers (2) with products (1) comprising:
   a hopper (3,3a) for containing a mass of products (1) in bulk;
   conveying means (5,6) for feeding said products (1) coming out of said hopper (3) along a predetermined path (P);
   a filling station (SR), situated downstream of said conveying means (5,6) for filling said containers (2) with the products (1);
   transporting means (4,C) for delivering said container to said filling station (SR); and
   a checking station (SC) for checking said products (1), situated along said path (P) upstream of said filling station (SR), said checking station (SC) including optical means (7) for checking each product (1), to determine if each said product is acceptable for packaging by identifying determined physical features of said product (1) and for counting the products passing to said filling station (SR), said optical means sending reference signals to a processing device (E) connected to the optical means (7), the processing device using the reference signals to determine whether or not each said product is acceptable;
   said conveying means (5,6) including first vibrating conveying means (51,52,53) consisting of vibrating planes, and second conveying means (6) situated at said checking station (SC) between said first vibrating conveying means (51,52,53) and said filling station (SR), product holding means (65) associated with said second conveying means (6) for holding single products so as to form on said second conveying means (6), a series of single spaced apart products (1), moving forward to said filling station (SR) along a part of said path (P), said second conveying means (6) including a drum (6) rotating continuously, which moves said series of single spaced apart products (1) to said filling station (SR) along a curved portion of said path (P), a whole peripheral surface of said drum (6) having a plurality of grooves (64), each groove having lateral walls (64a, 64b) and a bottom, the lateral walls of each groove converging toward the bottom of each groove in order to receive said products therein, a plurality of holding means (65), each holding means connecting to pairs of channels (66), each of said holding means (65) and each said pair of channels (66) communicating between pairs of holes in each of said grooves (64) and a suction source, such that each hole connects through a pair of channels (66) to two adjacent holding means (65), said pairs of holes having openings close to each other for holding said products (1) within the grooves on the surface of said drum by aspiration, said checking station checking said products held on said drum;
   said filling station (SR) includes a plurality of feeding channels (9), through which transiting products (1) pass, and deflecting means (8) for detaching said products (1) held in the grooves (64) of said drum (6) and transferring selected products (1) into said feeding channels (9), said deflecting means (8) include a plurality of deflecting bars (81), each of which is associated to a relative feeding channel (9);
   each of said deflecting bars (81) being operated by activating means controlled by the processing device (E), to move alternately between a detach position (A), in which a free end of the bar (81) is situated close to said drum (6), in order to detach a product (1) conveyed by the drum (6) and to allow the product (1) to enter a relative channel (9), and a single products rejection position (B), in which a free end of the bar (81) is situated far from said drum (6), in order to allow said products (1) to move on the drum (6) past the filling station, until they reach a deflecting panel (85), that makes the single products (1) fall into a rejection container (86), each deflecting bar being responsive to a reference signal received from the processing device to either pass an individual product for rejection or to detach an individual product for filling a container such that individual products are either detached from the drum for packaging or conveyed to the deflecting panel where they fall into the reject container.

2. The unit according to claim 1 wherein said optical means (7) include at least one video camera (71), which detects information concerning features of said products (1) located on said second conveying means {6).

3. The unit according to claim 1 wherein each feeding channel (9) is defined by an upper housing (91), whose outlet mouth communicates with an inlet mouth of a lower housing (92), which is in turn equipped with a relative outlet mouth situated above a container (2); and further comprising bulkhead means (93) situated between said upper housing (91) and said lower housing (92), said bulkhead means (93) being operated, by said processing device (E), to move alternately between a position, in which said outlet mouth of said upper housing (91) is closed and a position, in which the same outlet mouth is open.

4. The unit according to claim 1 wherein said first vibrating conveying means (51,52,53) and said second conveying means (6) are equipped with a plurality of guides or grooves (54,64), on which the products (1) move; said holding means (65) acting on said grooves (64) of said second conveying means (6) to hold the series of single products (1) along the portion of path (P).

5. A packaging machine (M) containing at least one unit (100) according to claim 1.

* * * * *